United States Patent
Moulton

[11] Patent Number: 5,740,190
[45] Date of Patent: Apr. 14, 1998

[54] THREE-COLOR COHERENT LIGHT SYSTEM

[75] Inventor: Peter Moulton, Concord, Mass.

[73] Assignee: Schwartz Electro-Optics, Inc., Orlando, Fla.

[21] Appl. No.: 652,098

[22] Filed: May 23, 1996

[51] Int. Cl.$^6$ ........................................ H01S 3/10
[52] U.S. Cl. ........................ 372/23; 372/22; 359/328; 359/330
[58] Field of Search ................... 372/22, 23; 359/328, 359/330

[56] References Cited

U.S. PATENT DOCUMENTS

| | | |
|---|---|---|
| 3,605,039 | 9/1971 | Harris . |
| 3,818,129 | 6/1974 | Yamamoto . |
| 4,125,816 | 11/1978 | Boling et al. . |
| 4,338,578 | 7/1982 | Sukhman . |
| 4,720,747 | 1/1988 | Crowley . |
| 4,851,918 | 7/1989 | Crowley . |
| 4,866,720 | 9/1989 | Holly ........................... 372/23 |
| 4,920,541 | 4/1990 | Baugartner et al. . |
| 5,008,890 | 4/1991 | McFarlane . |
| 5,119,385 | 6/1992 | Aoshima et al. . |
| 5,136,426 | 8/1992 | Linden et al. . |
| 5,212,706 | 5/1993 | Jain . |
| 5,228,050 | 7/1993 | LaCourse et al. . |
| 5,249,193 | 9/1993 | Watanabe . |
| 5,257,275 | 10/1993 | Trussell et al. . |
| 5,291,503 | 3/1994 | Geiger et al. . |
| 5,307,359 | 4/1994 | Sarraf . |
| 5,319,655 | 6/1994 | Thornton . |
| 5,325,380 | 6/1994 | Clendening et al. . |
| 5,331,649 | 7/1994 | Dacquay et al. . |
| 5,337,348 | 8/1994 | Knize . |
| 5,384,797 | 1/1995 | Welch et al. . |
| 5,386,428 | 1/1995 | Thornton et al. . |
| 5,396,507 | 3/1995 | Kaminow et al. . |
| 5,400,173 | 3/1995 | Komine ........................... 372/23 |

*Primary Examiner*—Leon Scott, Jr.
*Attorney, Agent, or Firm*—Iandiorio & Teska

[57] ABSTRACT

A three-color coherent light system includes a laser source for generating a laser beam in the 1000–1100 nm wavelength region; means, responsive to the laser source, for generating the second harmonic of the laser beam; an optical parametric oscillator for providing a signal beam and an idler beam; means for splitting the second harmonic of the laser beam into a first beam for providing a source of coherent green light and a second beam for pumping the optical parametric oscillator to produce the signal and idler beams; means for generating the second harmonic of the signal beam as a source of coherent blue light; and means for generating the second harmonic of the idler beam as a source of coherent red light.

18 Claims, 4 Drawing Sheets

THREE-COLOR COHERENT LIGHT SYSTEM

FIELD OF INVENTION

This invention relates to a three-color coherent light system, and more particularly to such a system which uses an optical parametric oscillator to achieve a balance of saturation and luminosity.

BACKGROUND OF INVENTION

There is considerable interest in the use of coherent sources for display of images, given the brightness of a coherent source compared to conventional light sources such as incandescent or arc lamps. For example, existing color image-projection systems based on conventional lamps require a darkened room for viewing large image sizes. On the other hand, coherent sources of sufficient power can generate large, easily viewable images even in the presence of a high level of ambient light.

Lasers for image display can operate either in the continuous-wave (cw) or pulsed mode. Examples of systems that utilize pulsed lasers include those described in U.S. Pat. No. 3,818,129, issued Jun. 18, 1974 to Yamamoto and No. 4,720,747, issued Jan. 19, 1988 to Crowley. The disclosures employ coherent sources at wavelengths in the red, green and blue wavelength regions, which are combined with acousto-optic modulators to project full-color images produced by video electrical signals.

The disclosure of Yamamoto utilizes coherent sources based on solid state lasers and nonlinear optics. Specifically, green light at 532 nm is generated from the second harmonic of a pulsed Nd-doped $Y_3Al_5O_{12}$(Nd:YAG) laser operating at 1064 nm. Red light at approximately 660 nm is produced from the second harmonic of another Nd:YAG laser operating at 1320 nm, while blue light at approximately 440 nm is generated from the third harmonic of the same laser. Another disclosure, U.S. Pat. No. 4,866,720, issued Sep. 12, 1989 to Holly, describes, by reference to the standard CIE 1931 Chromaticity Diagram, the advantage of the wavelengths generated by the Nd:YAG harmonics in producing a wide gamut of colors for display applications.

An alternate approach to three-color generation from pulsed solid state lasers is disclosed in U.S. Pat. No. 4,338,578, issued Jul. 6, 1982 to Sukhman and applicable to pulsed, three-color holography. In this case the green source is the second harmonic of a pulsed Nd:YAG laser, the red source is a pulsed ruby laser at 694 nm and the blue source, at 420 nm, is derived by sum-frequency generation with the outputs of the Nd:YAG and ruby lasers. The low pulse rate available from the ruby laser limits the utility of this approach for display or other imaging applications.

CW three-color sources have been disclosed. A variation on the use of Nd-doped lasers is taught by U.S. Pat. 5,307,359, issued Apr. 26, 1994 to Sarraf, in which cw, Nd-doped waveguide lasers at 1060 and 1300 nm are doubled to produce 530-nm green and 650-nm red light, while a semiconductor laser at 870 nm that optically pumps the Nd-doped lasers is also doubled to produce 435-nm blue light. In U.S. Pat. No. 5,317,348, issued May 31, 1994 to Knize a variety of semiconductor lasers and solid state lasers are discussed as possible sources for three-color projectors. These cw systems are limited in power by the properties of waveguide and semiconductor lasers and are not suited for the type of modulation schemes disclosed by Yamamoto and Crowley.

In Crowley, the use of metal-vapor lasers as pulsed, visible light sources is considered as a preferable approach. It is suggested that for imaging systems blue, green and red wavelengths at 472, 510 and 628 nm can be produced by bismuth-, copper- and gold-vapor lasers, respectively. Crowley mentions several disadvantages of the solid state laser system of Yamamoto (and, by inference, those of Holly), including the low luminous efficiency of the 660-nm red and 440-nm blue wavelengths. The luminosity of a light source is a measure of the apparent brightness of the source to the human eye and is related not only to the power of the source but also to the wavelength. As a result, the red and blue lasers must operate at higher powers than desirable.

Although metal-vapor lasers have some favorable attributes, they also have a number of problems that limit their application in practical systems. They are bulky, require high-voltages, a long warm-up time and frequent maintenance to replenish the gas fill. In addition, the type of metal-vapor lasers used for generation of blue light are not capable of as high a power output as the red and green lasers. Thus systems based entirely on metal-vapor lasers are limited in their full-color imaging ability.

Other approaches to visible-light generation rely on the use of liquid-dye lasers, typically optically pumped by other lasers, either gas or solid state. In U.S. Pat. No. 5,136,426, issued Aug. 4, 1992, to Linden, a dye laser, pumped by an argon-ion gas laser, is used to generate the red source at 610 nm, while another argon-ion laser provides the green and blue light. One main advantage of dye lasers is tunability; with dyes one can adjust the laser wavelengths to trade between color gamut and luminous efficiency. The dye systems suffer from the extra complexity required to pump and store the dye, and from the possible toxic nature of the dyes and the solvents used with them. In addition, the dye solution suffers from both photo-induced and thermal degradation, which necessitates periodic solution replacement.

SUMMARY OF INVENTION

It is therefore an object of this invention to provide a pulsed, three-color coherent system that provides tunable wavelengths useful for imaging a wide gamut of colors but also having high luminous efficiency.

It is a further object of the invention to provide a pulsed, three-color coherent system based on solid state laser materials and nonlinear optics, eliminating the problems associated with gas or liquid laser media.

The invention results from the realization that a pulsed, solid state laser, preferably a Nd-doped material such as Nd:YAG or Nd:YLF, can be frequency doubled to generate green light, some of which is used for the particular application and the remainder of which is used to pump an optical parametric oscillator (OPO), which generates two wavelengths, a signal and an idler, in the near infrared. The signal wavelength is frequency doubled to generate blue light and the idler wavelength is frequency doubled to generate red light. By proper choice of the optical parametric oscillator operating point, the wavelengths of the red and blue light fall in optimal regions for both luminosity and good color reproduction. With suitable modulation techniques, the pulsed green, red and blue light can be used to create color images, or be used in other applications where three-color, coherent light is required.

This invention features a three-color coherent light system including a laser source for generating a laser beam in the 1000–1100 nm wavelength region and means responsive to the laser source for generating a second harmonic of the laser beam. An optical parametric oscillator provides a signal beam and an idler beam. There are means for splitting the second harmonic of the laser beam into a first beam for providing a source of coherent green light and a second beam for pumping the optical parametric oscillator to produce the signal and idler beams. There are means for generating the second harmonic of the signal beam as a source of coherent blue light and means for generating the second harmonic of the idler beam as the source of coherent red light.

In a preferred embodiment the laser source may include a solid state laser. The laser may be Nd:YAG, Nd:YVO$_4$ or Nd:YLF. The parametric oscillator may be made of LBO or KTP.

The invention also features a three-color coherent light system in which the laser source includes a first laser for generating a first coherent green laser beam and a second laser for generating a second laser beam in the 1000–1100 nm wavelength region. There are means responsive to the second laser for generating the second harmonic of the second laser beam and an optical parametric oscillator responsive to the second harmonic of the second laser beam for providing a signal beam and an idler beam. There are also means for generating the second harmonic of the signal beam as a source of coherent blue light and means for generating the second harmonic of the idler beam as the source of coherent red light.

In a broader concept the invention features a three-color coherent light system which includes an optical parametric oscillator for providing a signal beam and an idler beam and means for providing a first laser beam as a source of coherent green light and a second laser beam for pumping the optical parametric oscillator to produce the signal and idler beams. There are means for generating the second harmonic of the signal beam as the source of coherent blue light and means for generating the second harmonic of the idler beam as the source of coherent red light.

In a preferred embodiment the means for providing the first and second laser beams may include a laser for providing an initial laser beam, means for generating the second harmonic of the initial laser beam and means for splitting the second harmonic of the initial laser beam for providing the first and second laser beams. The laser may operate in the region 1000–1100 nm.

DISCLOSURE OF PREFERRED EMBODIMENT

Other objects, features and advantages will occur to those skilled in the art from the following description of a preferred embodiment and the accompanying drawings, in which.

Figure 1:
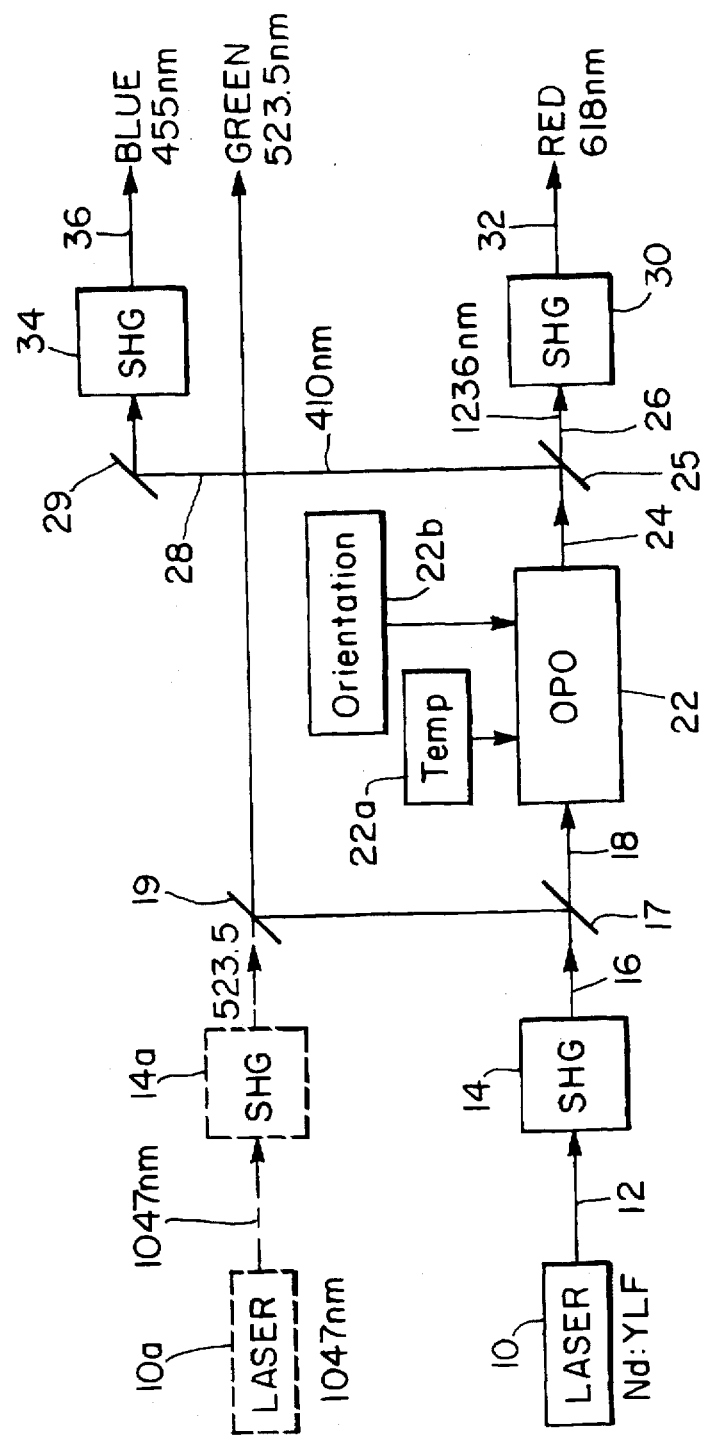
FIG. 1 is a schematic diagram of the three-color source, composed of a laser, second-harmonic generation crystals, an optical parametric oscillator and various beam-separation and directing mirrors.
Figure 2:
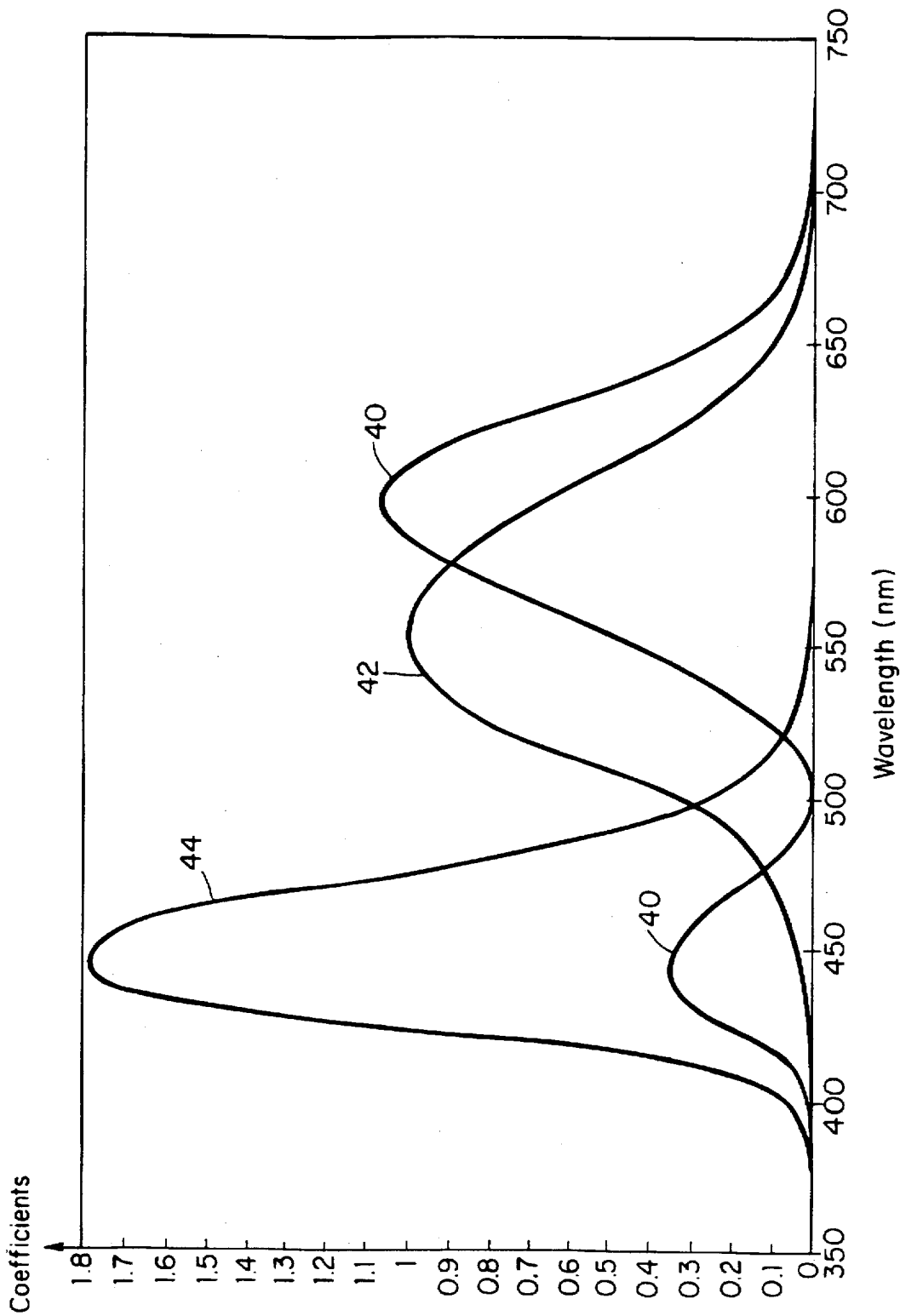
FIG. 2 is a plot of the CIE 1931 tristimulus values, used to analyze the color properties and luminosity of a spectral source.
Figure 3:
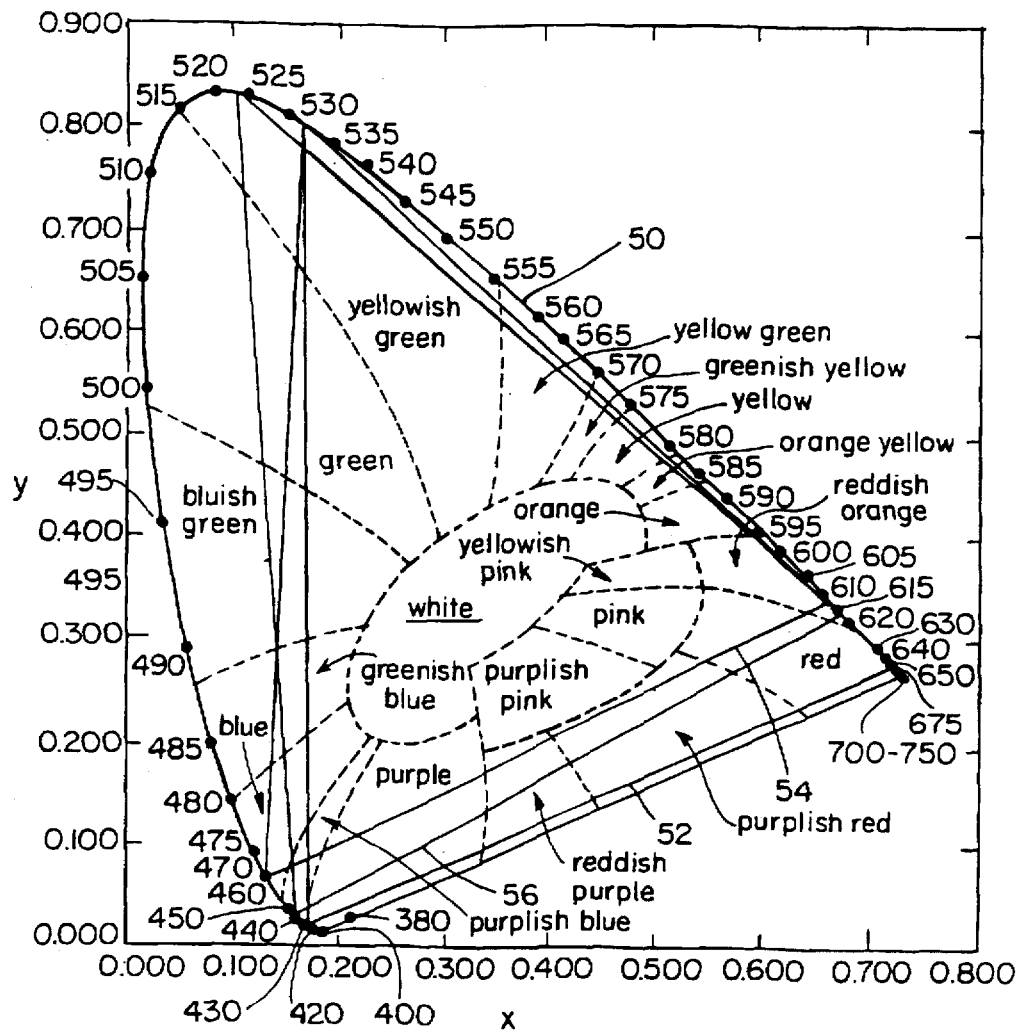
Figure 4:
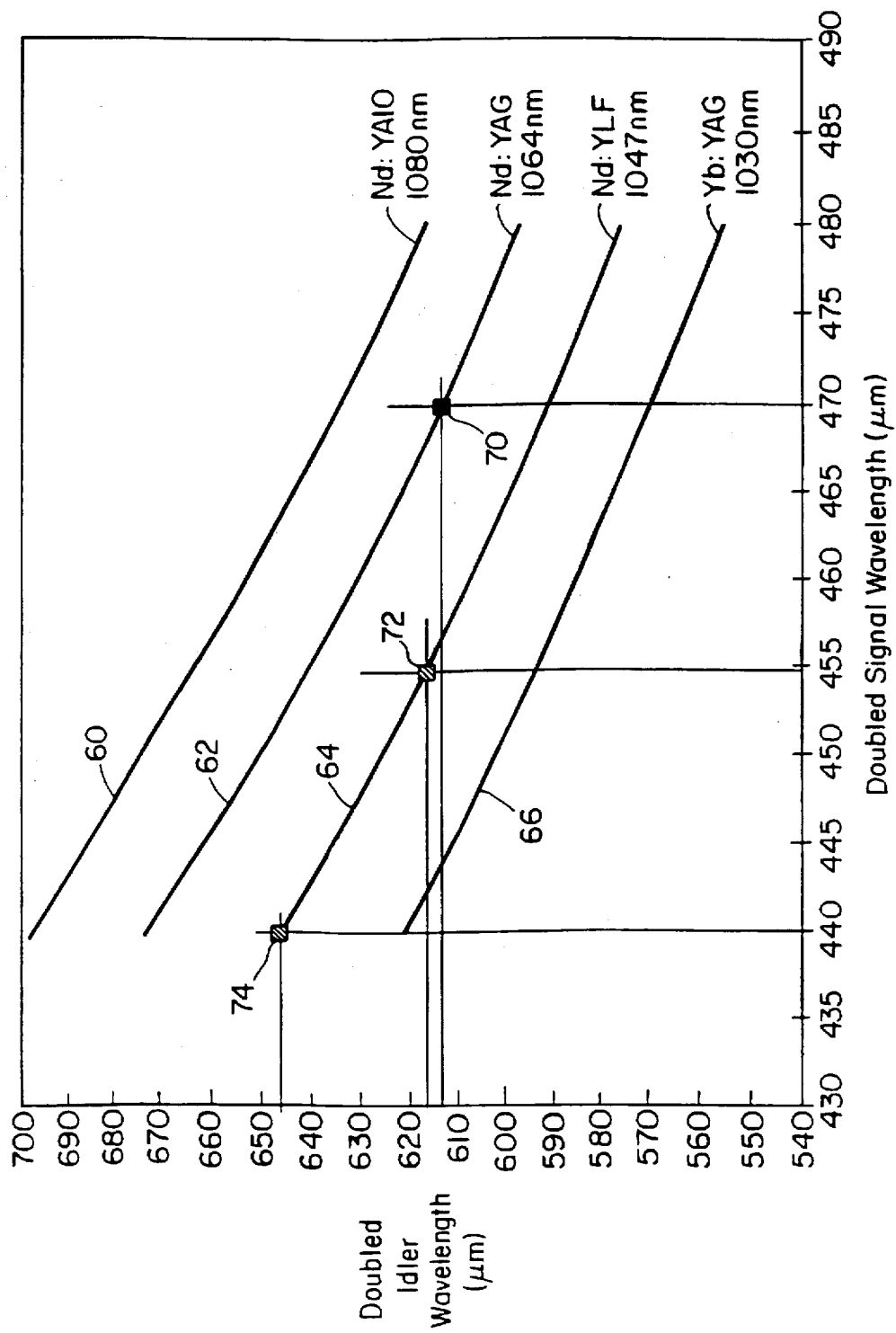

FIG. 3 is the CIE 1931 chromaticity diagram, used to gauge the color and saturation of light based on spectral properties derived from the curves in FIG. 2 and to also predict the color and saturation of light generated by the additive summation of a three-color laser source; and FIG. 4 is a plot for different laser wavelengths of the relation between the blue and red wavelengths generated by the system diagrammed in FIG. 1.

The diagram in FIG. 1 is an optical schematic of one implementation of the three-color coherent light source of this invention. The laser 10 produces an output beam 12 that is incident on a second-harmonic generation crystal 14. The resultant second-harmonic beam 16 is divided into two beams by beamsplitter mirror 17. One of the beams 18 is directed as a pump into an optical parametric oscillator 22, which produces two new wavelengths in the form of a signal and an idler beam, shown to be coincident as beam 24. The other beam is directed by mirror 19 into beam 20, the green wavelength of the system. The signal and idler beams 24 are separated by dichroic mirror 25. The idler beam 26 is directed into second-harmonic crystal 30 and the resultant second-harmonic beam 32 is used as the red wavelength in the system. The signal beam 28 is directed by mirror 29 into second-harmonic crystal 34 and the resultant second-harmonic beam 36 is used as the blue wavelength in the system.

Optical parametric oscillator 22 may be tuned by varying the temperature 22a or the orientation 22b of the crystal as is well known. Although laser 10 is used both to pump oscillator 22 and provide the coherent green light output 20, this is not a necessary limitation of the invention. Laser 10 may be used just to pump oscillator 22 and a second laser 10a may be used with second harmonic generator 14a to provide coherent green light output 20.

The design outlined in FIG. 1 with the proper choice of laser wavelength allows generation of red, green and blue wavelengths that produce a wide gamut of colors and also have high luminous efficiency. Two diagrams, FIGS. 2 and 3, provide the basis for understanding the relationship between wavelength, color and luminosity. It is known that three different wavelengths are sufficient to produce all colors in additive imaging schemes such as cathode-ray tubes (CRTs) or laser-based video projectors. If the spectral composition of the image is known in terms of optical power as a function of wavelength, S(λ), the apparent brightness and color of the image can be quantified through the use of the spectral tristimulus curves 40, 42, and 44 plotted in FIG. 2 as functions of wavelength. Three quantities, X, Y and Z, are calculated by integrating over wavelength the product of S(λ) and curves 40, 42, and 44, respectively. The quantity Y represents the luminosity of the image and from the shape of curve 42 it is clear that the human-eye response in terms of brightness peaks in the region around 550 nm, and falls off rapidly at much shorter and longer wavelengths.

The color of the image is typically analyzed using normalized quantities x, y and z that are independent of the total optical power. The values for x,y and z are given by:

$$x=X/(X+Y+Z),$$

$$y=Y/(X+Y+Z),$$

and $$z=1-(x+y).$$

The CIE 1931 Chromaticity Diagram, presented in FIG. 3, is a graphical representation of perceived color as a function of the two normalized quantities x and y. The region inside the arm enclosed by line 50 contains x, y pairs representing all possible colors. The x,y pairs falling exactly on the curved section of the line represent the colors produced by a monochromatic optical source, i.e., one with a narrow spectral linewidth, such as most lasers. The color "white" having equal levels of red, green and blue components is represented by the x,y pair ⅓, ⅓. The gamut of colors generated by combining three monochromatic sources can be determined through the construction of a triangle with corners placed at the red, green and blue wavelengths falling on curve 50. The colors that can be synthesized by the three-color source are contained within the area of the triangle. The closer a color point is to the line 50 the more the color is termed to be "saturated." If the widest gamut is desired, one wavelength, the "red" source, should be near one extreme of curve 50, 700 nm, while the "blue" source should be near another extreme, approximately 400 nm. The "green" source should be in the 520-nm region.

For practical reasons, color imaging systems operate with blue and red wavelengths away from the extreme points, because of the low sensitivity of the human eye to wavelengths at either end of the visible-wavelength range. Consider the need in an imaging system to generate the color white, with essentially equal components of red, green and blue. The definition of white may vary somewhat from system to system; for the US National Television Standards Committee (NTSC) color television system white is defined as x=0.310, y=0.316 and z=0.374. For purposes of discussion, consider the exact case where x=y=z. One can then readily calculate the relative powers required for white generation from each of the sources through the use of the tristimulus curves shown in FIG. 2. Let Pr, Pg and Pb be the required relative powers for the red, green and blue sources, respectively. For illustrative purposes, consider the calculation for a system based on Nd:YAG lasers, as disclosed in Yamamoto, cited previously, i.e., red, green and blue wavelengths of 660, 532 and 440 nm. For this case, the relative powers (where we set the green power, Pg, to unity) are, approximately:

Pr=4.6, Pg=1, Pb=0.65.

The large relative power required for the red source is the result of the poor response of the human eye to the red wavelength of 660 nm, as is evident from the tristiumulus curves of FIG. 2. Triangle 52 in FIG. 3 represents the use of the wavelengths just discussed, showing that a wide gamut of colors can be synthesized. The major drawback to the system cited is the need to employ much higher powers from the red source than from the green or blue sources, simply to be able to synthesize the color white. The calculation of the quantity Y, employing the relative powers above, provides a measure of the relative luminosity, L, of the white light generated with the wavelengths in question; this value is approximately 1.2

A better compromise between color gamut, required power and luminosity can be realized with the use of a red wavelength shorter than 660 nm. In the following, we show how the invention disclosed here accomplishes this, while still relying on all-solid-state components. The invention occurs because of the recognition that an optical parametric oscillator, or OPO, can function to produce the desired optimum wavelengths. An OPO is a nonlinear device that uses the optical gain induced by a three-wave, phase-matched parametric interaction in a nonlinear crystal to generate two new wavelengths, signal ($\lambda s$) and idler ($\lambda i$) from an input pump wavelength ($\lambda p$). The relationship between the wavelengths, set by the conservation of energy, is:

$1/\lambda p = 1/\lambda s + 1/\lambda i$

FIG. 4 shows the relationship between the frequency-doubled signal and idler wavelengths for the OPO-based source disclosed in FIG. 1. The plot is equivalent to displaying $\lambda s$ over the range 860–940 nm and $\lambda i$ over the range 1080–1400 nm. Each of the curves represents a different wavelength that can be produced by a well-known solid state laser. Table 1 presents the relationship between curve number, approximate wavelength and laser material(s). It is understood that there are a multitude of other possible solid state laser materials capable of generating pump wavelengths similar to those presented in FIG. 4.

TABLE 1

| Curve | Laser wavelength (nm) | Laser material(s) |
|---|---|---|
| 60 | 1080 | Nd:YAlO$_3$ (YAlO) |
| 62 | 1065 | Nd:YAG, Nd:YVO$_4$ |
| 64 | 1047 | Nd:LiYF$_4$ (YLF) |
| 66 | 1030 | Yb:YAG |

Referring to FIG. 4, consider for illustrative purposes two operating points that can be obtained for the OPO-based system. Point 70, on the curve associated with Nd:YAG (or Nd:YVO$_4$) lasers, corresponds to red and blue wavelengths of 613 and 470 nm. The green wavelength is the laser second harmonic, 532 nm. The red, green and blue wavelengths are similar to the peak wavelengths of CRT phosphors used in the NTSC television system. Point 72 is associated with a Nd:YLF laser operating at 1047 nm, and has red, green and blue wavelengths of 455, 523.5 and 616 nm. Table 2 summarizes for points 70 and 72, as well as for the prior example based on the invention of Yamamoto, the relative powers needed to obtain a white color, and the relative luminosity of the white color for a green power of unity.

TABLE 2

| System | Pr | Pg | Pb | L |
|---|---|---|---|---|
| Yamamoto | 4.6 | 1 | 0.65 | 1.18 |
| Point 70, FIG. 4 | 1.15 | 1 | 1.17 | 1.54 |
| Point 72, FIG. 4 | 1 | 1 | 0.67 | 1.23 |

It is evident from Table 2 that, in the process of synthesizing a white color, the two OPO-based sources used as examples require much less power from the red source compared to the laser system disclosed in the Yamamoto invention. In addition, for the same green power, the OPO systems produce a higher luminosity for white while using less total power from the three sources. In FIG. 3, triangles 54 and 56 represent the color coverage possible with points 70 and 72, respectively. As with the system of Yamamoto, all colors can be accessed with the OPO-based sources, with some reduction of the saturation of the red-purple colors and some increase in the saturation of blue-green colors.

From FIG. 4 it is clear that the OPO-based source in this invention will permit generation of longer-wavelength red and shorter-wavelength green light for applications where maximum color saturation is required and the resultant increase in source power, especially for the red source, can be tolerated. As an example, point 74 in FIG. 4 corresponds to red, green and blue wavelengths of 440, 523.5 and 646 nm, which would lead to essentially the same level of saturation as the Yamamoto invention for purple-red colors and higher saturation for blue-green colors. Conversely, the OPO-based source can be used where lower color saturation can be tolerated by operating at a point with a shorter "red" wavelength and a longer "blue" wavelength.

The actual implementation of the OPO-based system depends on the availability of nonlinear materials that can be phase-matched to perform the function of an OPO at the particular wavelengths required for color generation. In addition, nonlinear materials are required to perform the various second-harmonic functions shown in FIG. 1.

Recent art in OPOs teaches the favorable use of one particular material, $LiB_3O_5$(LBO) and a class of materials based on the isomorphs of the crystal $KTiOPO_4$(KTP), although other nonlinear crystals are known to have suitable properties. The materials cited are of interest because they have been operated successfully with high-average-power pump lasers for other nonlinear functions, particularly harmonic generation, and would thus be suitable for, say, projection display of large-area images.

The material LBO, with Type I phase-matching, has been operated in a particularly favorable OPO condition, that of non-critical phase-matching (NCPM), when pumped by the green-wavelength, second-harmonic of Nd:YAG or Nd:YLF lasers. With NCPM, the pump, signal and idler waves all propagate down one of the principal axes of the nonlinear crystal, thus avoiding the problem of beam walk-off common to phase-matching away from the NCPM condition. With no beam walkoff, the OPO threshold for operation with a given length of nonlinear material is minimized. In the case of LBO, the wavelength of the signal and idler beams can be tuned by changing the temperature of the LBO crystal. An article by Kato, IEEE J. Quantum Electronics 26, 2043 (1990) discusses a LBO NCPM OPO pumped by the second-harmonic of a pulsed Nd:YAG laser, where the signal wavelength tuned from 1006 to 950 nm as the crystal temperature was varied from 20° to 120° C., and tuning to shorter wavelengths was limited only by the particular apparatus used to heat the crystal. Another article by Zhou et al, Appl. Phys. Lett. 62, 1457 (1993) shows temperature tuning of the signal wavelength of a LBO OPO from 780 to 930 nm, limited by the properties of the OPO mirrors. Thus the combined tuning data from the two articles covers almost all of curve 62 shown in FIG. 4, when one calculates the second harmonic of the reported signal wavelengths. Using the second-harmonic of a Nd:YLF laser, Ebrahimzadeh et al., Opt. Lett. 18, 278 (1993) describe a temperature-tuned LBO NCPM OPO that covers a range greater than curve 64 in FIG. 4. Thus there is adequate prior art to demonstrate the feasibility of LBO as an OPO material for the invention disclosed here.

Another OPO material to consider is KTP or one of its isomorphs. Typical OPO designs for tunable KTP OPOs employ Type II, angle-matched operation. Marshall et al., Opt. Lett. 18, 817 (1993) have reported a KTP Type II OPO pumped by the second-harmonic of a pulsed Nd:YAG laser, where the signal wavelength was angle-tuned from 760–1040 nm, a span greater then curve 62 in FIG. 4. It is possible to operate KTP-isomorph OPOs with Type II NCPM, but, unlike LBO, there is little change in signal/idler wavelengths with temperature. However, through the use of different isomorphs, one can obtain different OPO wavelengths. In addition, NCPM can be accomplished for waves propagating down either the x or y axes of the crystal, and thus each isomorph is capable of generating two different sets of NCPM signal and idler wavelengths for a given pump wavelength. Table 3 presents calculated signal and idler NCPM wavelengths for KTP and the isomorphs $KTiOAsO_4$ (KTA), $RbTiOAsO_4$(RTA) and $RbTiOPO_4$(RTP) with frequency-doubled Nd:YAG (or, equivalently, Nd:YVO$_4$) and Nd:YLF pump lasers and selected orientations.

TABLE 3

| Pump Laser | Crystal | Cut | Signal (nm) | Idler (nm) | Signal SHG (nm) | Idler SHG (nm) |
|---|---|---|---|---|---|---|
| Nd:YAG | KTA | x | 956 | 1200 | 478 | 600 |
| Nd:YAG | RTP | x | 946 | 1215 | 473 | 608 |
| Nd:YAG | KTP | y | 946 | 1215 | 473 | 608 |
| Nd:YAG | RTA | y | 954 | 1203 | 477 | 601 |
| Nd:YLF | KTA | x | 918 | 1218 | 459 | 609 |
| Nd:YLF | RTP | x | 910 | 1232 | 455 | 616 |
| Nd:YLF | RTA | y | 918 | 1218 | 459 | 609 |

In the chart above the signal wave has a wavelength always shorter than that of the idler, independent of the polarization of either wave. One report of NCPM operation of a x-cut RTP OPO (M. Itoh et al., Paper CThK5, CLEO '93 Conference Proceedings, Optical Society of America, Washington, D.C.) describes a system pumped by a frequency-doubled Nd:YAG laser that operated at a signal wavelength of 947.1 nm, in excellent agreement with the prediction in Table 3. As is clear from Table 3, there are several choices for OPO materials that would provide a suitable combination of red and blue wavelengths, close to points 70 and 72 in FIG. 4. Additional flexibility in the wavelengths generated by the KTP family of materials can be accomplished by doping the crystals, as described by Loiacono et al., Appl. Phys. Lett. 64, 16 (1994), or by forming alloys between different crystals within the family.

As for the availability of nonlinear crystals to perform the functions of second-harmonic generation, as indicated in FIG. 1, there are a number of materials that may be utilized. For example, the crystal LBO can, with the appropriate configuration, generate green, red and blue light i.e. be used in function blocks 14, 30 and 34 shown in FIG. 1. With Type I NCPM, data on LBO, from Kato, IEEE J. Quantum Electronics, 30, 2950 (1994), show that the material can produce second-harmonic wavelengths ranging from 475 to 875 nm over a temperature span from approximately −10° to 320° C. (Shorter wavelengths in the blue may, in theory, be generated at temperatures higher than 320° C., but there is no supporting data.) An alternate approach to blue-light generation with LBO is the use of angle matching, and both Type I and Type II configurations can be employed with second-harmonic wavelengths for blue wavelengths as short as 400 nm, as shown in Rines et al., IEEE J. Selected Topics in Quantum Electronics 1, 50 (1995). The same reference shows that another nonlinear material, β-$BaB_2O_4$(BBO), can be used in either Type I or II angle-matched configurations to generate either green or blue wavelengths. The KTP family of materials can be used for green and red generation in Type II angle-matched configurations, as described by Anthon et al., Appl. Optics 27, 2650 (1988).

Those skilled in the art will recognize that the actual implementation of the system diagrammed in FIG. 1 can take many forms. As examples but not limits to different implementations, second-harmonic generation of the pump laser 10 can be accomplished with the nonlinear crystal in the optical resonator of the pump laser (intracavity generation) or external to the resonator. External harmonic generation can be with or without a resonant-enhancement cavity. The OPO 22 can have a cavity resonant for the signal wave, idler wave or both. The cavity can be resonant for the pump wave as well. Injection-seeding by a narrow-spectral-linewidth coherent source of the pump laser, signal and/or idler waves can be employed for spectral control of the output. Finally, the second-harmonic generation processes for the blue and red beams can either take place with both red and blue harmonic-generation crystals inside the OPO cavity, with one crystal internal and the other external, or with both crystals external. In all cases where nonlinear crystals are employed, the actual design might employ multiple crystals arranged to compensate for walk-off, where angle-matching is used, or in general to increase the nonlinear interaction length.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A three-color coherent light system comprising:

a laser source for generating a laser beam in the 1000–1100 nm wavelength region;

means, responsive to said laser source, for generating a second harmonic of said laser beam;

an optical parametric oscillator for providing a signal beam and an idler beam;

means for splitting said second harmonic of said laser beam into a first beam for providing a source of coherent green light and a second beam for pumping said optical parametric oscillator to produce said signal and idler beams;

means for generating the second harmonic of said signal beam as a source of coherent blue light; and means for generating the second harmonic of said idler beam as a source of coherent red light.

2. The three-color coherent light system of claim 1 in which said laser source includes a solid state laser.

3. The three-color coherent light system of claim 2 in which said laser is Nd:YAG.

4. The three-color coherent light system of claim 2 in which said laser is Nd:YVO$_4$.

5. The three-color coherent light system of claim 2 in which said laser is Nd:YLF.

6. The three-color coherent light system of claim 1 in which said optical parametric oscillator includes a nonlinear LBO crystal.

7. The three-color coherent light system of claim 1 in which said optical parametric oscillator includes a nonlinear KTP crystal or an isomorph of KTP.

8. A three-color coherent light system comprising:

a laser source including a first laser for generating a first coherent green laser beam and a second laser for generating a second laser beam in the 1000–1100 nm wavelength region;

means, responsive to said second laser, for generating the second harmonic of said second laser beam;

an optical parametric oscillator, responsive to the second harmonic of said second laser beam, for providing a signal beam and an idler beam;

means for generating the second harmonic of said signal beam as a source of coherent blue light; and means for generating the second harmonic of said idler beam as a source of coherent red light.

9. The three-color coherent light system of claim 8 in which said first and second lasers are solid state lasers.

10. The three-color coherent light system of claim 9 in which said first and second lasers are Nd:YAG.

11. The three-color coherent light system of claim 9 in which said first and second lasers are Nd:YVO$_4$.

12. The three-color coherent light system of claim 9 in which said first and second lasers are Nd:YLF.

13. The three-color coherent light system of claim 8 in which said optical parametric oscillator includes a nonlinear LBO crystal.

14. The three-color coherent light system of claim 8 in which said optical parametric oscillator includes a nonlinear KTP crystal or an isomorph of KTP.

15. A three-color coherent light system comprising:

an optical parametric oscillator for providing a signal beam and an idler beam;

means for providing a first laser beam as a source of coherent green light and a second laser beam for pumping said optical parametric oscillator to produce said signal and idler beams;

means for generating the second harmonic of said signal beam as a source of coherent blue light; and means for generating the second harmonic of said idler beam as a source of coherent red light.

16. The three-color coherent light system of claim 15 in which said means for providing said first and second laser beams includes first and second lasers, respectively.

17. The three-color coherent light system of claim 15 in which said means for providing said first and second laser beams includes a laser for providing an initial laser beam, means for generating the second harmonic of said initial laser beam, and means for splitting said second harmonic of said initial laser beam for providing said first and second laser beams.

18. The three-color coherent light system of claim 17 in which said laser operates in the region of 1000–1100 nm.

* * * * *